United States Patent [19]
Buccicone

[11] 3,957,361
[45] May 18, 1976

[54] SPRING ATTACHMENT FOR EYEGLASS FRAMES

[75] Inventor: Dario Buccicone, Gary, Ind.

[73] Assignee: Bucciconi Engineering Co., Inc., Gary, Ind.

[22] Filed: Nov. 7, 1974

[21] Appl. No.: 521,574

[52] U.S. Cl. .............................................. 351/123
[51] Int. Cl.² ....................... G02C 5/14; G02C 5/20
[58] Field of Search ..................... 351/118, 119, 123

[56] References Cited
UNITED STATES PATENTS
3,701,591  10/1972  Wichers ........................ 351/119 X

*Primary Examiner*—Paul A. Sacher
*Attorney, Agent, or Firm*—Guy A. Greenawalt

[57] ABSTRACT

A wire spring attachment for mounting on the temples of eyeglass frames so as to exert a pull on the temples when the eyeglasses are in use with sufficient pressure against the back of the head or upper neck portion of the wearer to prevent movement of the eyeglasses out of proper position, especially, when the wearer moves his head out of normal upright position in leaning over or the like.

This invention relates to eyeglass constructions and is more particularly concerned with improvements in attachments for eyeglass frame structures which are adapted to hold the eyeglass in proper position on the head of the wearer.

9 Claims, 9 Drawing Figures

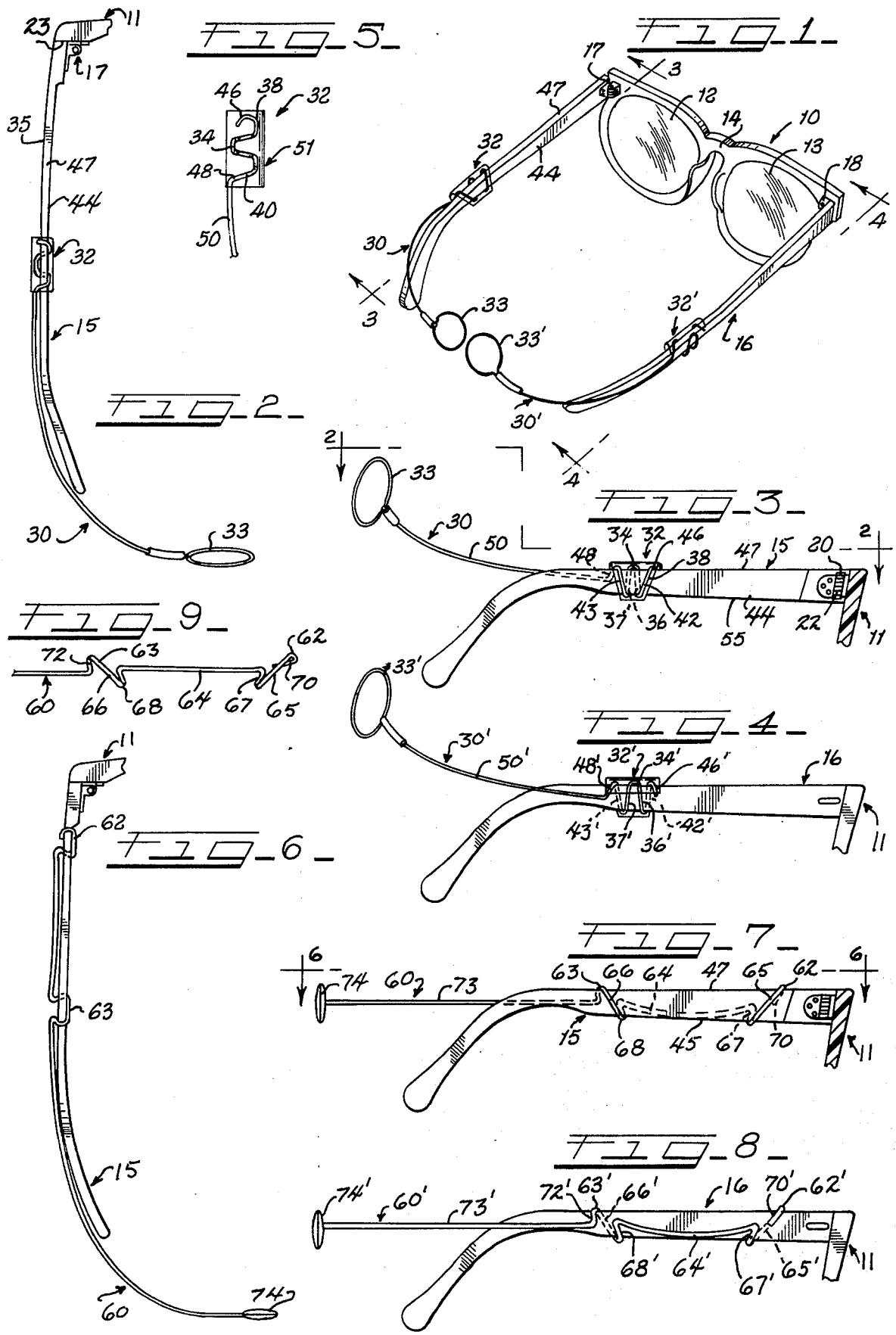

SPRING ATTACHMENT FOR EYEGLASS FRAMES

It is a conventional practice in fabricating eyeglass frames to hinge the temples to the lens-receiving section of the frame so that they may be folded flat upon the back face of the lens section when not in use and stored in a case or the like. When it is desired to use the eyeglasses the temples may be swung to an open position where they are spread apart sufficient for the lenses to be placed in proper position for use on the head of the wearer. Generally, the frames are formed of a metal or plastic material, or a combination thereof, which permits of some adjustments permitting the frame to be fitted to the head of the wearer for comfortable use with the temples spaced generally so as to apply very little, if any, pressure on the head. In normal use, with the head in upright position, this is sufficient to hold the eyeglasses in proper position for correct vision. However, after a period of use the temples frequently become spread apart by wear or they are sprung to an extent that they no longer exercise sufficient grip on the head to hold the frame in proper placement but permit the weight of the frame to drag the same down on the nose where the lenses are not properly spaced or located relative to the eyes. Also, in performing some tasks, the wearer may be required to lean over or lower his head so that the frame tends to drop off or slide down out of position, particularly when the areas which the temples engage become wet due to perspiration. Numerous efforts have been made to provide some means for overcoming this tendency of a normal frame arrangement to fail in holding the glasses in proper position at all times, particularly under adverse conditions. However, no fully satisfactory arrangement has been developed, heretofore. Some eyeglass frame structures have been suggested which include spring loading of the temple mounting but such arrangements rely on the application of substantial pressure on the side of the head, with headache resulting in many cases. Another arrangement which has been offered is the provision of rubber-like pad members mounted on the temples, generally adjacent the free ends thereof which press against the side of the head and rely primarily upon frictional contact to anchor the temples. Other apparently unsuccessful efforts have been made to provide a mounting which satisfactorily solves the problem of holding the eyeglass frame in proper position on the wearer's head when head movement is in a direction tending to dislodge the frame or the head is shifted to a position, where, due to gravitational pull on the frame, it will slide out of proper position. Some arrangements which have been suggested have proven to be unattractive and have not been accepted for lack of aesthetic appeal. It is a general object, therefore, of the present invention to provide an improved attachment for eyeglass frame structures which will hold the frame against movement when it is in proper position for use on the head of the wearer and which will avoid, to a large degree, dislodgement of the frame when the wearer leans over or otherwise shifts his head so that the weight of the eyeglasses would normally cause the frame to fall off or slide out of proper position and which is not objectionable from an aesthetic standpoint.

It is a more specific object of the invention to provide an attachment for mounting on an eyeglass frame structure which will apply a pulling force to the temples so that when the eyeglasses are placed on the head of the wearer, in proper position for use, the temples will be urged in the direction of the head with sufficient force to hold the frame in position during normal head movement and resist dislodgement of the frame when the head is moved out of the normal upright position.

A still more specific object of the invention is to provide an attachment for spring loading the temples of eyeglass frames so as to urge the temples toward the rear of the head and hold the frame on the head when the latter is moved about and the frame is subject to forces tending to dislodge the frame, wherein the attachment is constructed so that it may be readily attached to the majority of eyeglass frame structures in which the temples are hinged to the outboard portions of lens receiving frame sections.

A further object of the invention is to provide an attachment for spring loading the temple members of an eyeglass frame which comprises an elongate wire spring member having attaching portions at one of its ends which are bent so as to hook over portions of the temple in clamping relation and having its opposite end portions bent so as to curve into engagement with the back of the head or the upper neck area at the back of the head of the wearer and exert a pulling force on the temple in the direction to hold the frame in proper position, without exerting undue pressure on the area engaged.

Another object of the invention is to provide an attachment for the temple members of eyeglass frames which is in the form of an elongate wire spring member having means for adjustably anchoring the member at one end thereof on the temple member, with portions extending along the temple and the other end thereof adapted to be adjustably formed to resiliently engage a portion of the back of the head or an upper portion of the back of the neck so as to exert sufficient pull on the temple to hold the frame in position on the wearer.

These and other objects and advantages of the invention will be apparent from a consideration of the several forms of an eyeglass frame attachment which is shown by way of illustration in the accompanying drawings wherein:

FIG. 1 is a perspective view of an eyeglass frame having a spring attachment on the temples which incorporates the principal features of the invention;

FIG. 2 is a top plan view showing one of the temples of the frame of FIG. 1, to an enlarged scale, with the spring attachment in operative position thereon;

FIG. 3 is a fragmentary view, to an enlarged scale, the view being taken on the line 3—3 of FIG. 1, showing the inside face of the one temple with the spring attachment thereon;

FIG. 4 is an elevational view taken on the line 4—4 of FIG. 1, to an enlarged scale;

FIG. 5 is a fragmentary top plan view showing the mounting end of the spring attachment removed from the frame;

FIG. 6 is a top plan view showing a modified form of the spring attachment applied to the one temple member, the view corresponding to the view in FIG. 2;

FIG. 7 is a view taken as in FIG. 3, showing the modified form of the spring attachment;

FIG. 8 is a view taken as in FIG. 4 showing the modified form of the spring attachment; and FIG. 9 is an elevational view showing the mounting end of the modified spring attachment when removed from the temple.

Referring first to FIG. 1, there is illustrated an eyeglass frame structure 10 which comprises a front frame section 11 having provision for mounting thereon a pair of lenses 12 and 13 on opposite sides of a bridge piece 14. A pair of temple bars or arm members 15 and 16 are connected at their forward ends by hinge structures 17 and 18 with the outboard margins of the lens frame 11. The temple arms 15 and 16, when in the open position, are adapted to fit along the sides of the temple of the wearer and each arm has at its free end a curved or bent configuration designed to rest on the top of the ear lobe with a turned down portion designed to fit against the head at the back of the ear. The temple arms 15 and 16 are, of course, right and lefts, but otherwise they are of identical structure. In the form of the frame shown the forward end of each of the temple arms 15 and 16 is connected to the lens frame section, as shown in FIGS. 2 and 3, by a hinge pin 20 operating in bearing lugs or tongues 22 extending in interleaved relation from the frame members. The end edge 23 of each temple arm is adapted to abut against the face of the frame section 11, with the latter forming a stop to limit the outward movement of the temple arm. The structure thus far described in typical of eyeglass frames offered commercially.

A spring member 30, as shown in FIGS. 2 to 5, which embodies the present invention, is mounted on the temple arm or bar member 15 of the frame 10 at a point spaced from the free end thereof and spaced from the hinge connection between the temple arm 15 and the one side of the lens receiving portion 11 of the frame 10, which, in the form shown, is a relatively straight portion of the temple arm 15. A like spring member, but of the opposite hand, is mounted on the temple 16 of the frame 10 in the same manner. Since the two spring members are of identical construction except for being right and left hand, only one will be described in detail while corresponding elements of the other will be identified by the same numerals primed.

The spring member 30 is fabricated from a length of resilient spring wire with one end bent or shaped, as shown, to provide a clamp assembly 32, enabling clamping attachment or mounting on the temple member 15. The opposite end of the wire is looped at 33 so as to provide a pad-like terminus for comfortable engagement with a portion of the back of the head when the frame is in normal position on the wearer's head. The clamp assembly 32 is shaped or bent so as to grip the temple member 15, which, in the form shown, is substantially rectangular in cross section. The clamp assembly 32 comprises a middle portion 34, which is looped or reversely bent, so as to lie along one side face of the temple member 15, the outside face 35 in the form shown, when the attachment is mounted on the temple arm member. Portions adjoining the bottom ends of the somewhat downwardly diverging legs or arms 36 and 37 (FIG. 3) of the middle loop portion 34 are reversely bent, upwardly in diverging planes which are normal to the plane of the legs 36 and 37 of the middle loop portion 34, thereby forming bent loop portions 38 and 40 (FIG. 3), with upwardly slanted leg or arm portions 42 and 43 in a plane generally parallel with the plane of the looped portion 34 so as to lie along the opposite, inner face 44 of the temple member 15 with the curved portions forming the connection with the middle loop formation engaging over the bottom edge 45 of the temple arm member 15. The leg portion 42 terminates at a bent over end portion 46 which is adapted to engage or hook over the top edge 47 of the temple member 15 while the portion 43 extends to a bent over or reversely bent top portion 48 which is adapted to engage over the top edge 47 of the temple member 15 in spaced relation to the bent over end portion 46 and spaced on opposite sides of the middle loop portion 34. The bent over portion 48 extends to and joins the end of the curved wire portion 50 which extends to the pad forming end 33 of the attachment and forms the connection between the clamp assembly 32 and the end pad 33. The wire portion 50 may be bent into the proper curvature to comfortably engage the end pad 33 with the back of the head. The downwardly diverging slant of the leg portions 36, 37 and upwardly diverging slant of the leg portions 42, 43, taken with the relative height of the loop portions 38, 40 and the resiliency of the wire, is such that a gripping effect is obtained when the assembly is positioned on a temple arm of dimensions within predetermined limits which gripping effect is increased by any pull on the portion 50 in the rearward direction. The majority of commercially available eyeglass frames are provided with temple bars or arms approximating standard dimensions and the clamp assembly 32 may be fabricated to accommodate substantial variations in temple arm dimensions. It will, of course, be understood that the size of the loop portions 38 and 40 may be varied according to the dimensions of the temple arms on which it is desired to mount the attachment. Also, the resiliency of the spring wire must be such that the wire may be permanently bent to form the clamp assembly while at the same time permitting sufficient flexibility to enable the attachment of the clamp end onto the temple arms and to adjust the bend in the pad end portion for a comfortable fit on the head of the wearer. A covering sheath, indicated at 51, preferably, of a relatively thin elastic plastic material, may be provided to enclose the clamp assembly 32 and prevent metal-to-skin contact. The end loop 33 may be covered in like manner.

A modified form of the attachment is illustrated in FIGS. 6 to 9. In this form, the attachment 60 comprises a length of spring wire having an end section bent or formed as shown in FIG. 9 to provide two clamping loop formations 62 and 63 connected by a slightly bowed length or portion 64 of the wire material. The loop formations 62 and 63 have straight bar or leg portions 65 and 66 which are in a common vertical plane and in upwardly diverging relation. The material at the lower ends of the bar portions 65 and 66 is reversely bent at 67 and 68 and extends for approximately half the corresponding dimension of the bar portions 65 and 66, connecting with opposite ends of the wire section 64 so as to engage over the bottom edge 45 of the temple arm member 15 when the attachment 60 is mounted on temple arm 15, a shown in FIGS. 6 to 8, with the connecting wire section 64 lying along the outside face 35 of the temple arm 15. At the upper or top end of the bar portion 65, the end or terminal portion 70 of the wire is reversely bent in the direction of the connecting wire section 64 so as to hook over the top edge 47 of the temple arm 15 while at the top of the bar portion 66 the wire section 72 is reversely bent, also in the direction of the connecting wire section 64 so as to hook over the top edge 47 of the temple arm 15. The bent over wire portion 72 connects with the inner end of a curved wire section 73 which extends to and terminates at a small pad formation 74 which is adapted for engaging the back of the head of the wearer. The pad 74 may be made of plastic, rubber or any relatively soft or smooth material for comfortable engagement with the head. The modified form 60, 60' of the attachment is mounted on the temple arm or bar in the same manner as the form of the device shown in FIGS. 1 to 5 and may be adjusted on the temple arm and bent to engage the back of the head in the same manner as the form 30, 30'.

In both forms of the attachment illustrated the attaching end portion which is adapted to be mounted on the temple arm embodies two loop portions or wire bends extending in opposite directions with a connecting portion which results in the looped portions gripping more tightly the temple arm when the head contacting portion of the attachment is pulled in the direction to slide the attachment along or off of the temple arm. In both forms the strength of the wire is such as to take shape and hold it after it is bent. The head engaging portions can be manually shaped for maximum comfort and holding ability. The portions of the attachment which would otherwise be in contact with the skin may be covered by a sheath or coating of plastic or other suitable material to avoid any possible irritation of the skin. The attachment extends, for the most part, along the back of the head, where it is less likely to be noticed and is not objectionable from an aesthetic standpoint.

I claim:

1. A spring attachment for eyeglass frames which have a lens holding portion with pivotally mounted temple arms at each side thereof, said attachment comprising an elongate, resilient wire member having a portion at one end for removably attaching to a temple arm and a pad formation at the other end, said temple attaching portion being formed so that it may be secured on the temple arm for adjustment lengthwise of said temple arm with said other end extended and curved inwardly and upwardly so as to bring the pad formation into resilient engagement with an upper portion of the back of the wearer's head when the glasses are worn in normal position.

2. An attachment for eyeglass frames which have a lens mounting portion and temple arms pivoted at each side of said lens mounting portion, said attachment comprising a length of resilient wire having means on one end for removably engaging in resilient clamping relation on a temple arm, said wire being of sufficient length to extend beyond the free end of said temple arm when mounted on said temple arm, and said wire being shaped so that the unattached end will be positioned for resilient engagement with the upper portion of the back of the head of the wearer when the glasses are in normal position on the head of the wearer and said wire having sufficient resiliency to exert a pulling force on the temple arm so as to resist movement of the glasses out of said normal position.

3. An attachment for eyeglass frames as set forth in claim 2 wherein said means for engaging in clamping relation on said temple arm comprises an end portion of the wire which is bent to encircle said temple arm and to grip said arm at points spaced longitudinally of said temple arm.

4. An attachment for eyeglass frames as set forth in claim 2 wherein said means for engaging in clamping relation on said temple arms comprises a pair of bent wire portions in the form of loops which are spaced lengthwise of said arm and which encircle said arm so as to form adjustable clamping elements.

5. An attachment for eyeglass frames as set forth in claim 2 wherein said means for engaging in clamping relation on said temple arm comprises wire loop formations on said one end which are spaced axially of said temple arm and which are in upwardly diverging transverse planes so as to grip said temple arm and resist disengagement when subject to a force acting in the direction lengthwise of said temple arm.

6. An attachment for eyeglass frames as set forth in claim 2 wherein said means for engaging in clamping relation on said temple arm comprises bent wire portions which are in the form of a pair of partially open loops disposed in spaced transverse planes which are in diverging relation so that when mounted on the temple arm they frictionally engage oppositely disposed surfaces of said arm and resist movement in the direction lengthwise of said temple arm.

7. An attachment for eyeglass frames as set forth in claim 2 wherein said means for engaging in clamping relation on a temple arm comprises wire portions shaped so as to at least partially encircle said temple arm and frictionally engage said temple arm while enabling removal and replacement for adjustment thereon and said unattached end is bendable to adjust the position of the head engaging portion.

8. An attachment for eyeglass frames as set forth in claim 7 wherein a cover member is provided for said shaped wire portions which is of a material which is non-irritating to the skin.

9. An attachment for eyeglass frames as set forth in claim 2 wherein the unattached end of said attachment is provided with a pad formation for comfortable engagement with the back of the head of the wearer.

* * * * *